(12) United States Patent
Jordan

(10) Patent No.: US 9,790,065 B2
(45) Date of Patent: Oct. 17, 2017

(54) SOLAR ARRAY LIFTER AND METHOD

(71) Applicant: Travis Jordan, Ronan, MT (US)

(72) Inventor: Travis Jordan, Ronan, MT (US)

( * ) Notice: Subject to any disclaimer, the term of this patent is extended or adjusted under 35 U.S.C. 154(b) by 28 days.

(21) Appl. No.: 14/262,507

(22) Filed: Apr. 25, 2014

(65) Prior Publication Data

US 2014/0319439 A1    Oct. 30, 2014

Related U.S. Application Data

(60) Provisional application No. 61/816,032, filed on Apr. 25, 2013.

(51) Int. Cl.
*B66D 3/04* (2006.01)
*F24J 2/52* (2006.01)

(52) U.S. Cl.
CPC .............. *B66D 3/04* (2013.01); *F24J 2/5232* (2013.01); *F24J 2002/5273* (2013.01); *F24J 2002/5281* (2013.01); *Y02E 10/47* (2013.01)

(58) Field of Classification Search
USPC ........................................................ 254/334
See application file for complete search history.

(56) References Cited

U.S. PATENT DOCUMENTS

| | | | | |
|---|---|---|---|---|
| 3,924,751 A * | 12/1975 | Ballenger | ................ | B62H 3/12 211/117 |
| 3,976,283 A | 8/1976 | Schmit | | |
| 5,199,843 A * | 4/1993 | Sferra | ........................ | E04H 6/02 414/286 |
| 5,897,104 A * | 4/1999 | Garbiso | .................... | B66C 1/18 248/327 |
| 6,161,702 A | 12/2000 | Campbell | | |
| 7,150,449 B1 | 12/2006 | Dueck et al. | | |
| 7,530,325 B2 * | 5/2009 | Swenson | ................. | E04H 12/32 116/173 |
| 8,033,529 B2 * | 10/2011 | Boda | ........................ | B62H 3/12 254/372 |
| 8,109,225 B2 | 2/2012 | McCudden et al. | | |
| 8,130,168 B1 * | 3/2012 | Sergi | ...................... | H01Q 1/084 343/878 |
| 8,258,394 B2 * | 9/2012 | Baruh | ...................... | B63H 9/04 136/245 |
| 8,944,413 B1 * | 2/2015 | Hatch | ...................... | B66D 1/12 254/323 |
| 2002/0149536 A1 * | 10/2002 | Safakhah | ............. | H01Q 1/1207 343/882 |
| 2009/0090895 A1 * | 4/2009 | Hogan, Jr. | ............. | A01G 9/022 254/266 |
| 2010/0170188 A1 * | 7/2010 | Zilmer | .................... | B66C 23/18 52/745.17 |
| 2010/0237305 A1 * | 9/2010 | Miller | ...................... | B66F 7/02 254/358 |

(Continued)

*Primary Examiner* — Emmanuel M Marcelo
*Assistant Examiner* — Michael Gallion
(74) *Attorney, Agent, or Firm* — Robert L. Shaver; Shaver & Swanson, LLP

(57) ABSTRACT

A solar array lifting assembly and method. The device and method use a support pole, a pole bracket for supporting a solar array made up of a frame and solar panels, a pole bracket securing mechanism for securing the pole bracket at a predetermined height, and a lifting assembly for lifting the pole bracket and solar array along the support pole.

9 Claims, 6 Drawing Sheets

(56) References Cited

U.S. PATENT DOCUMENTS

| | | | |
|---|---|---|---|
| 2010/0314509 A1* | 12/2010 | Conger | F24J 2/5241 |
| | | | 248/121 |
| 2011/0181018 A1* | 7/2011 | Bruneau | B60P 3/10 |
| | | | 280/414.1 |
| 2011/0271608 A1* | 11/2011 | Egan | E04H 12/10 |
| | | | 52/122.1 |
| 2012/0152877 A1* | 6/2012 | Tadayon | B25J 5/02 |
| | | | 212/224 |
| 2012/0181494 A1* | 7/2012 | Guyard | B66F 3/00 |
| | | | 254/385 |
| 2012/0227788 A1* | 9/2012 | Lundahl | F24J 2/523 |
| | | | 136/246 |
| 2012/0321416 A1* | 12/2012 | Nobles | B66C 1/18 |
| | | | 414/23 |
| 2013/0126809 A1* | 5/2013 | Britten | G09F 7/18 |
| | | | 254/385 |
| 2014/0096802 A1* | 4/2014 | Volin | A45B 25/143 |
| | | | 135/16 |

* cited by examiner

SOLAR ARRAY LIFTER AND METHOD

BACKGROUND

As the world population grows the demand for energy continues to increase. One of the current primary sources of energy is the burning of fossil fuels, such as coal, oil, and natural gas. This increase in demand necessitates additional sources of energy be utilised as the supply of fossil fuels fails to keep up. Current power generation methods using fossil fuels contribute to the emission of green house gases as well as other pollutants. In remote areas the transportation of fossil fuels or construction of power lines to a location can be difficult, dangerous and economically unfeasible.

One area of interest is the use of photovoltaic cells that generate electricity directly from sun light. The solar power systems utilise large flat panels that when exposed to sun light will generate electricity. These systems require large heavy arrays of solar panels in order to generate a significant amount of electricity. The weight and size of these arrays make it difficult to install the panels without the use of a crane or other heavy equipment.

Additionally, many applications for solar electricity are available because of the remote area of the installation. In remote locations, the use of heavy equipment may be difficult or impossible. If heavy equipment is not used, the installer must install the panels to a frame already high above the ground, requiring the use of a ladder that the installer has to carry the panels up in order to install. This installation procedure can be difficult and result in injury to the installer, damage to the solar array or damage to other nearby property.

In order to further facilitate the use of solar energy, it is necessary to improve the ability to quickly, safely and inexpensively install the solar panels. The use of a crane can be expensive as well as requiring significant space in which the crane can operate. These cranes require specialized training in order to operate as well as increased initial costs and maintenance. Alternatively, an installer can rent the heavy equipment but this leads to higher installation costs. Additionally, the crane requires sufficient room in order to lift the solar array and swing it over the position designated for the solar array and then lower the solar array back down onto the supports.

It would be advantageous to improve the installation of the solar array panels in order to reduce the cost of installation as well as improve limitations currently requiring the use a crane, heavy equipment or electricity.

SUMMARY

Disclosed is a solar array lifting assembly. The solar array assembly includes a support pole which is mounted vertically in the ground and is capable of supporting a pole bracket and a solar array that includes a frame and solar panels. The pole bracket is placed on the support pole near ground level so that the bracket can slide up and down on the support pole but cannot be moved horizontally.

Attached to the pole bracket is a frame. This frame attaches to the pole bracket and extends outward to allow for the attachment of one or more solar panels. The pole bracket preferably includes a pole bracket securing mechanism which allows the pole bracket to be secured to the support pole at a predetermined fixed height such as at the top of the support pole. The pole bracket securing mechanism can be a bolt that passes through the pole bracket and over the top of the support pole, or it can be other forms, such as a ratcheting roller within the pole bracket or a retracting support attached to the support pole. The frame can be assembled as well as the solar panels attached to the frame at ground level, with the pole bracket positioned near the ground level. Further included is the lifting assembly for lifting the solar array from ground level to the predetermined height on the support pole. The lifting assembly includes a lifting bracket which is placed on top of the support pole and extends vertically and horizontally away from the pole. The lifting bracket design allows for attachment of a lifting mechanism, such as a pulley, outside the diameter of the support pole. The lifting mechanism can have multiple designs, such as a chain fall hoist or a pulley, attached to the end of the lifting bracket.

A lift connector, such as chains or a cable, is attached to the lifting mechanism and to the pole bracket. In the case of a cable attached to a winch or vehicle to apply the force, the first end of the cable is attached to the pole bracket and the second end routed over a pulley, functioning as the lifting mechanism, and is attached to a winch capable of applying enough tension to the cable to lift the solar array into position. For purposes of discussion, a part described as a cable can mean a metal cable, a chain, a rope, or other flexible cord like materials. Multiple techniques can be used for the lifting assembly, such as a winch mounted to the pole, a mechanical gear hand crank winch, or an electric winch or a hi-gear ratio pulley can be used at the top with hand force to move the cable. Additionally, the pole bracket securing mechanism of the pole bracket can be multiple systems such as a simple bolt passing through the pole bracket and over the support pole.

Further disclosed is a method for lifting a solar array which includes the steps of mounting a support pole in the ground, the next step is placing a lifting bracket on top of the support pole with a pulley attached to the lifting bracket. The next step is attaching a cable end to the pole bracket, which slides on the pole, and attaching the second end of the cable to a tensioning device. The next step is routing the cable through the pulley and applying a tension force to the second end of the cable. This tension force must be sufficient to raise the solar array. Next, you must continue to apply tension to the cable until the array reaches a desirable height. The next step is the user secures the array at the desired height with a pole bracket securing mechanism. For this method the pulley can include gears to give the user the mechanical advantage. The steps can include using a retractable latch set in the pole at a desired height for a tie-down cleat or a ratcheting within the pole sleeve. The steps can include the use of multiple types of tensioning devices such as a manual or powered crank attached to the bottom of the pole or a winch mounted to the top of the pole and controlled by remote control.

DETAILED DESCRIPTION

As shown in FIGS. 1-11, the solar array lifting assembly 10 includes at least one support pole 14 which is secured in the ground and directed into a vertical position. Support pole 14 can be in many shapes such as round, oval or square but a circular metal pole is preferred. A typical installation would use a support pole of tubular steel, 8" in diameter and 15' in height. Support pole 14 must be capable of supporting a heavy solar array that is secured at the top of the pole.

Figure 1:
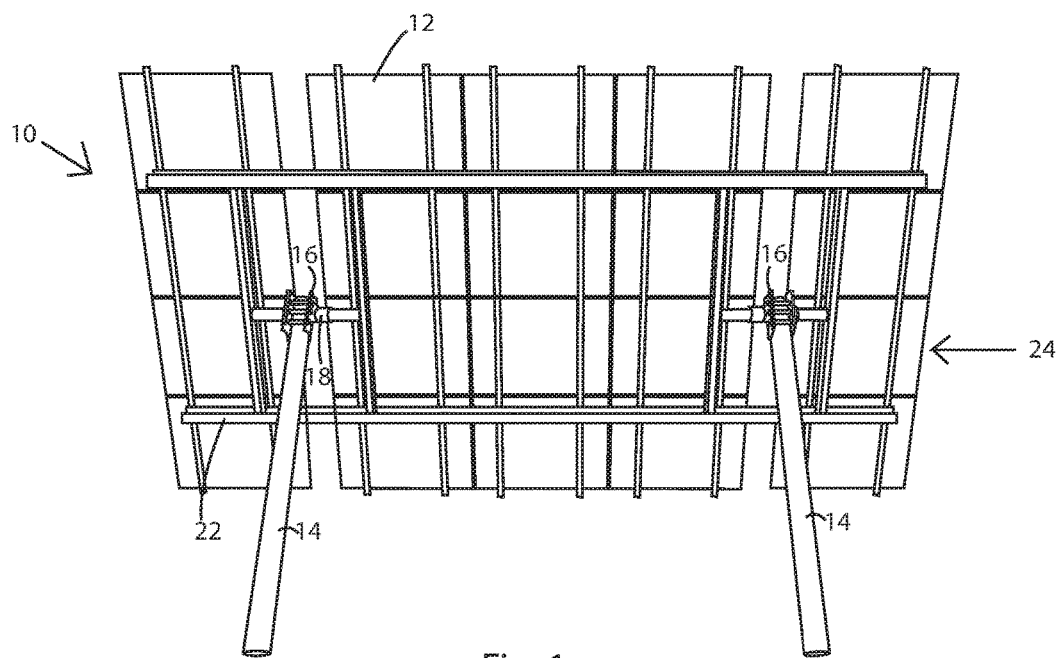
FIG. 1 is a perspective view showing the underside of an installed solar array in accordance with one embodiment of the inventive concepts.

FIG. 1 shows the use of multiple support poles 14 in order to facilitate larger solar arrays 24. Each solar array 24 is made up of frame 22 and solar panels 12. A typical solar array might be 8'×10'. The solar array 24 is created by attaching frame 22 to pole bracket 16, which is attached to support pole 14, and then attaching solar panels 12 to the frame 22, creating a large flat surface of solar panels 12. The creation of the solar array 24 is performed near ground level. FIG. 1 shows the solar array 24 after being lifted to the top of support poles 14.

Figure 2:
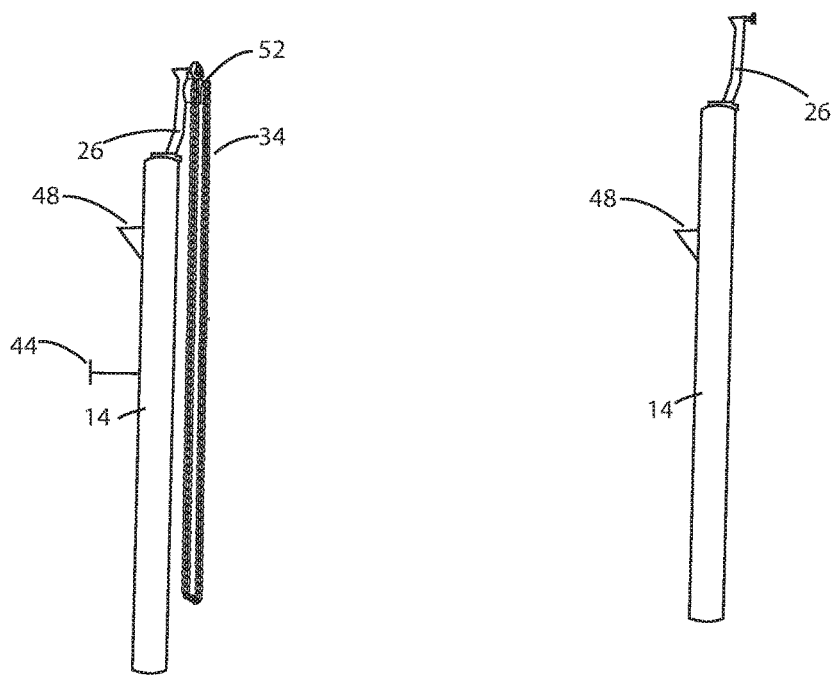
FIG. 2 is a perspective view of the support poles, lifting bracket, and one pulley in accordance with an embodiment of the inventive concepts.

FIG. 2 shows two support poles 14 having been placed in the ground. On top of each pole is lifting bracket 26 which is placed at the top of the pole and is capable of accepting lifting mechanism 52. Lifting mechanism 52 utilises lift cable 34 to transfer force from lifting mechanism 52 to pole bracket 16. FIG. 2 shows lifting mechanism 52 as a chain fall hoist. In the use of a chain fall hoist, lift cable 34 is a chain. While a chain fall hoist is shown, other lifting mechanisms such as pulleys, winches or similar devices are acceptable. Lifting mechanism 52 can be of various designs, such as a pulley. A 1 or 2 ton chain fall hoist is suitable for some installations.

FIG. 2 further shows alternative devices for securing the solar array at a desired height. In one embodiment once the solar array reaches the desired height the lift cable 34 is secured to tie-down cleat 44. FIG. 2 further shows the use of a retractable support 48 installed on the support pole 14. Retractable support 48 is capable of retracting into support pole 14. This retraction allows pole bracket 16 to slide over retractable support 48 when pole bracket 16 is being raised. Once pole bracket 16 passes over retractable support 48, retractable lock 48 extends outward to create a support for pole bracket 16.

Figure 3:
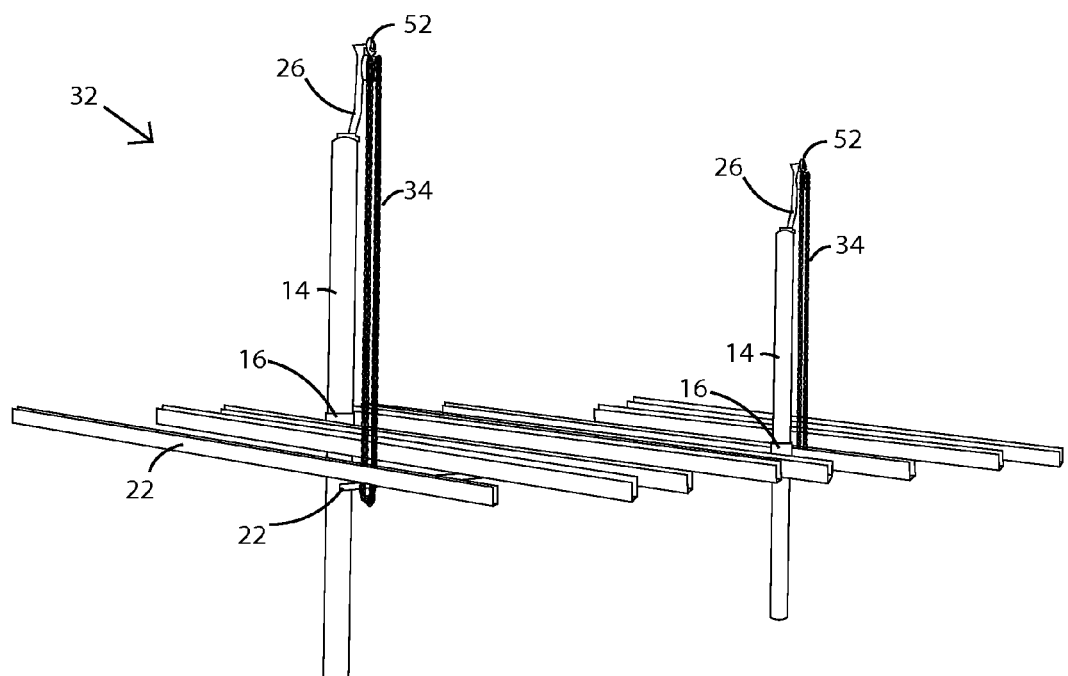
FIG. 3 is a perspective view of the support poles, frame, and lifting mechanism in accordance with an embodiment of the inventive concepts.

FIG. 3 shows the lifting assembly 32. Lifting assembly 32 is made of lifting bracket 26, which is placed on support pole 14, a lifting mechanism 52, and a lifting cable 34 attached between lifting bracket 26 and pole bracket 16. In FIG. 3 lifting cable 34 consists of chains attached to the lifting mechanism 52 and connected to the pole bracket 16. Frame 22 is attached to the pole bracket 16. Frame 22 is capable of accepting solar panels attached to the surface using nuts, bolts and other attachment mechanisms. In this configuration lifting assembly 32 is capable of applying sufficient force to raise the solar array to a predetermined position, such as the top of the support pole 14.

Figure 4:
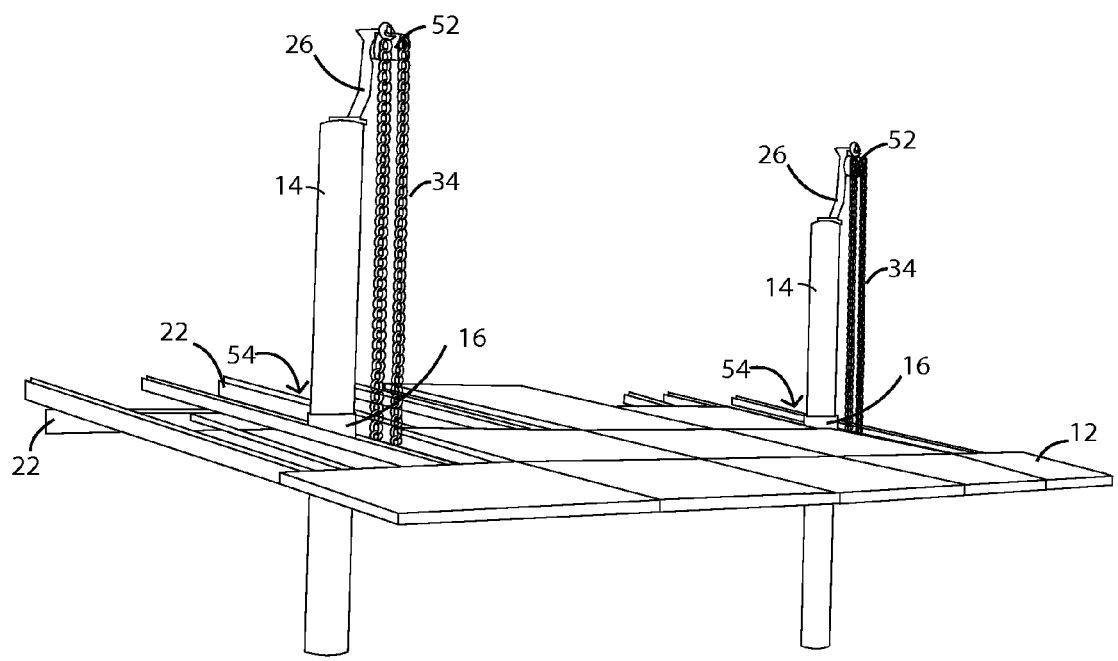
FIG. 4 is a perspective view of the support poles, frame, lifting mechanisms, with the solar panels partially installed in accordance with an embodiment of the inventive concepts.

FIG. 4 shows solar panels 12 partially installed on frame 22. The solar panels in FIG. 4 are installed so that there is a separation space 54 allowing for passage of support pole 14 as well as the chain 34. Once the solar array has been lifted to the top of support pole 14, the pole bracket is secured and the lifting mechanisms are removed, the separation space 54 can be covered by sliding solar panels into place, installing additional solar panels into separation space 54, or the separation space 54 can be left open.

Figure 5:
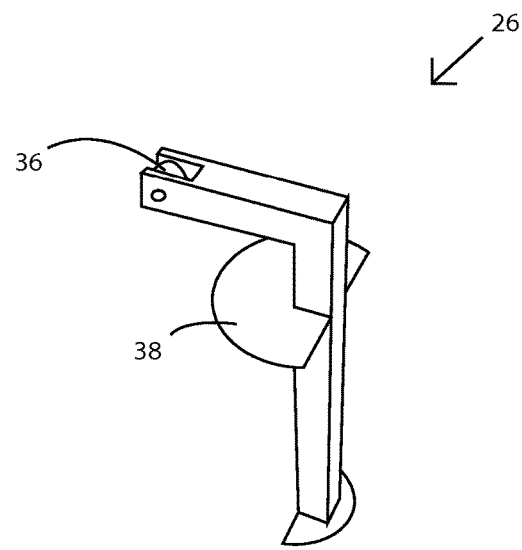
FIG. 5 is a perspective view of a lifting bracket in accordance with an embodiment of the inventive concepts.

FIG. 5 shows lifting bracket 26 with a simple pulley mounted on lifting bracket 26. Lifting bracket 26 is configured to extend outwardly beyond the outside diameter of support pole 14 and to extend into the interior of support pole 14. In this way a rope, cable, chains or other similar device can pass vertically down to the pole bracket mounted on a vertical pole and pull the pole bracket vertically without being interfered with by support pole 14. Lifting bracket 26 further includes bracket support 38 which is capable of supporting the bracket during lifting operations, but allows a bolt to pass through the pole bracket and across the top of the support pole 14. In the embodiment shown, lifting bracket 26 extends downwardly into the interior of the support pole 14.

Figure 6:
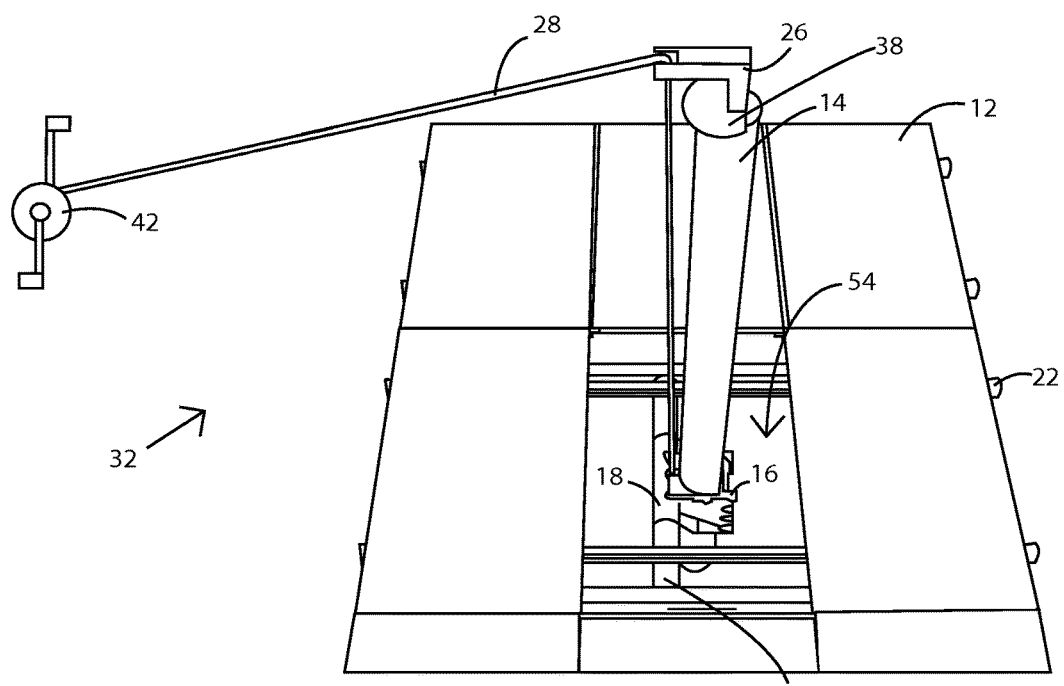
FIG. 6 is a top view of a solar array being lifted in accordance with an embodiment of the inventive concepts.
Figure 7:
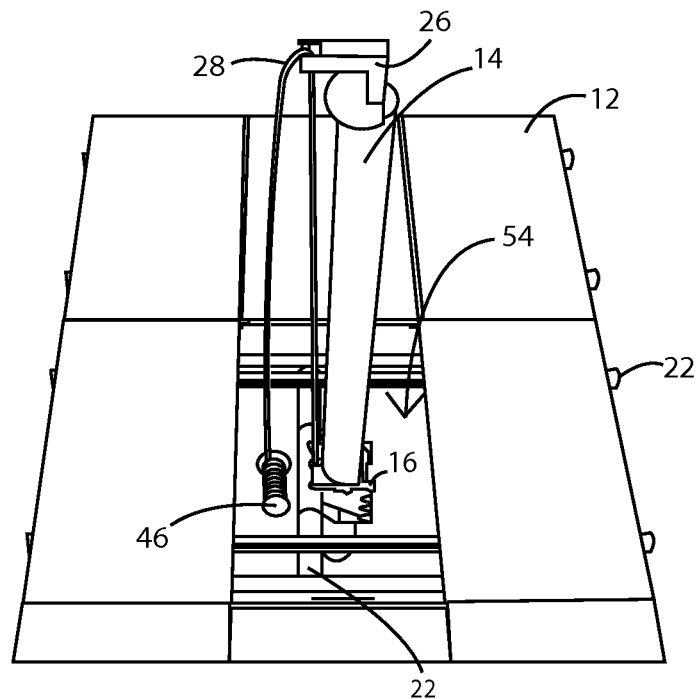
FIG. 7 is a top view of a solar array being lifted in accordance with an embodiment of the inventive concepts.
Figure 8:
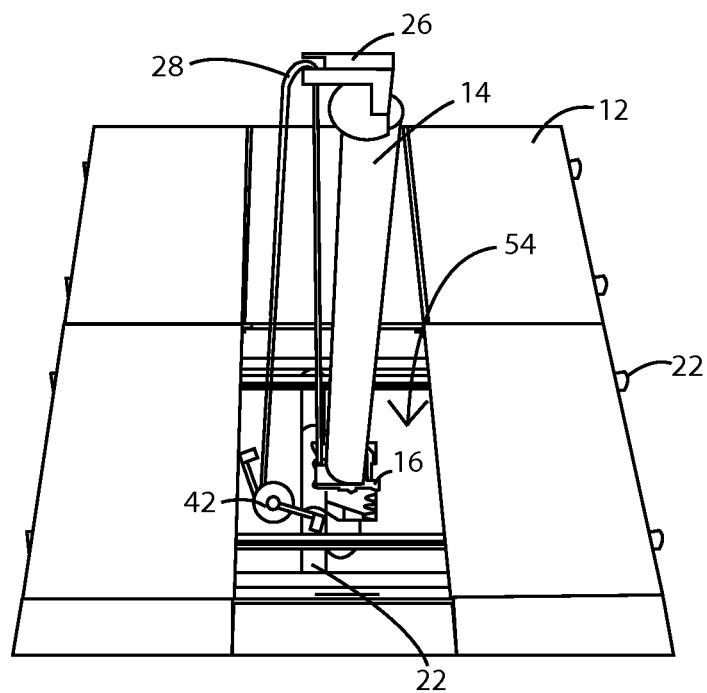
FIG. 8 is a top view of a solar array being lifted in accordance with an embodiment of the inventive concepts.
Figure 9:
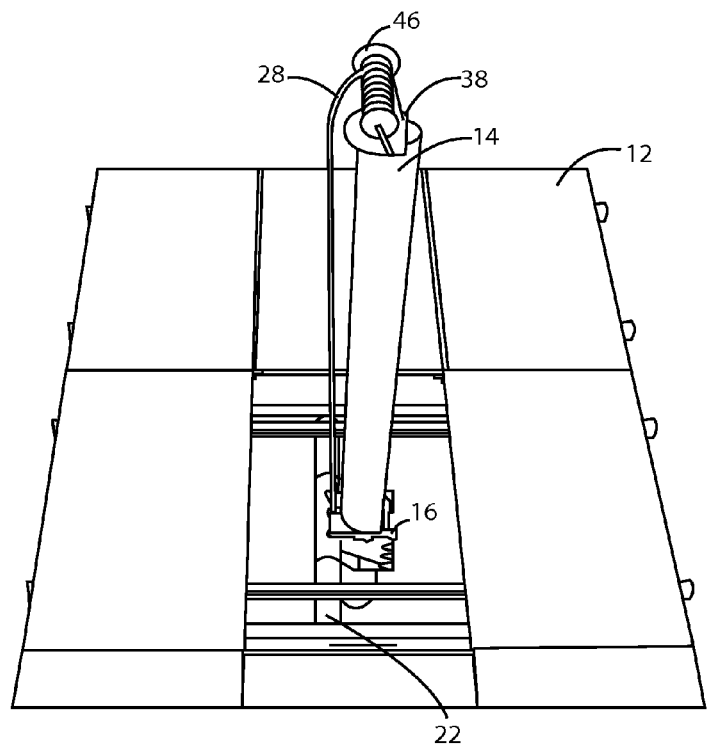
FIG. 9 is a top view of a solar array being lifted in accordance with an embodiment of the inventive concepts.

FIG. 6 shows a top view of the solar array lifting assembly 32 during the lifting of the solar array 24. Hand crank 42 is used in this example to apply tension to cable 28 which is routed around a pulley 36 at the end of lifting bracket 26 and is then attached to pole bracket 16. The tension force applied by the hand crank 42 must be sufficient to lift pole bracket 16 and the solar array. In place of hand crank 42 there can be other devices including an electric winch, or attachment to a vehicle or other pulling devices. FIG. 7 shows an alternate configuration where the hand crank is replaced with an electric winch 46 that is attached to the bottom of the support pole 14. FIG. 8 shows another possible configuration where the hand crank 42 has been attached to support pole 14 near the ground. Further, the electric winch with a remote control could be placed inside the lifting bracket 26 and lift the solar array directly with control from a remote control rather than requiring a pulley as in pulley 36, such as shown in FIG. 9.

Figure 10:
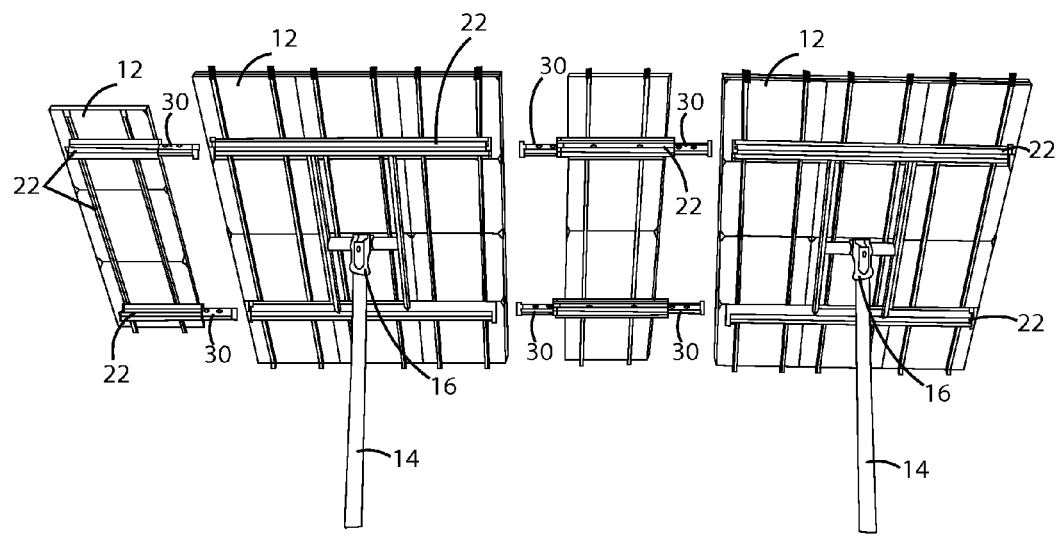
FIG. 10 is a bottom view of a solar array having frame extensions in accordance to an embodiment of the inventive concepts.

FIG. 10 is rear view of a lifted solar array where additional frame members 22 are added to support additional solar panels 12. In order to accomplish this frame extensions 30 are added to the already installed frame 22 so that frame extensions 30 extend beyond the already installed solar panels. Additional frame members 22 are then attached to the exposed section of frame extension 30 in order to facilitate attachment of additional solar panels. This allows for a more modular approach to solar panel installation where a user can add additional solar power capability without being required to do so at the time of initial installation.

Figure 11:
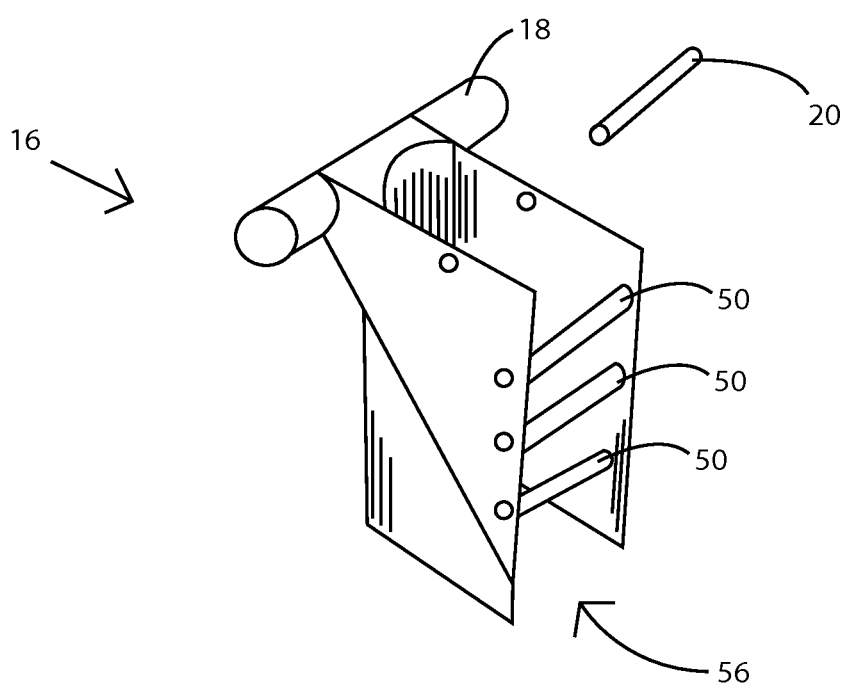
FIG. 11 is a perspective view of a pole bracket in accordance with an embodiment of the inventive concepts.

FIG. 11 shows a more detailed view of an embodiment of pole bracket 16. FIG. 11 shows pole bracket 16 having a frame attachment 18 capable of accepting a frame member and supporting the solar array. Prior to mounting on the support pole 14, pole bracket 16 has an open back. Once pole bracket 16 is placed on the support pole 14, fixed bolts 50 are placed across the open back 56. This configuration prevents pole bracket 16 from moving horizontally and coming off of the support pole. While any number of fixed bolts 50 is acceptable, the preferred embodiment shown utilizes 3 fixed bolts 50. These bolts would typically be ¾" bolts 10" long, steel bolts. Additionally, other mechanisms are acceptable such as a hingedly attached and lockable back plate, welding a back plate onto pole bracket 16, a pre-attached back plate placed over the support pole 14 from the top, and similar mechanisms that allow pole bracket 16 to slide up and down the support pole 14 while maintaining pole bracket 16 in a position surrounding the support pole 14. Pole bracket 16 further includes pole bracket securing mechanism 20 in order to secure pole bracket 16 at the top of support pole 14. While multiple devices are acceptable such as ratcheting roller mechanisms in pole bracket 16 or retractable pins located within the support pole, the preferred embodiment shown in FIG. 11 utilizes a bolt passing through pole bracket 16 and over the top of the support pole 14.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims

I claim:

1. A solar array lifting assembly, comprising:
at least one support pole, for vertical mounting in the ground and capable of supporting a solar array at a selected height above the ground;
at least one pole bracket configured to at least partially surround said at least one support pole, configured to slide up and down said support pole, and configured to support a frame to which solar panels are attached;
a pole bracket securing mechanism for securing said pole bracket at the top of said support pole, with said pole bracket securing mechanism comprising a removable bolt which is passable from side to side of pole bracket above a top edge of said support pole;
said frame for attachment to said pole bracket and for structural support and attachment of said solar panels, said frame and said solar panels forming said solar array, with said frame configured for assembly around said support pole at ground level, and placement of said solar panels directly above said support pole; and
a lifting bracket removably placeable at said top end of said support pole, said lifting bracket extending vertically and horizontally to a position outside of the diameter of said support pole, said lifting bracket having a bracket support for securing said lifting bracket in a selected position on said support pole, and a lifting mechanism for pulling said pole bracket up or down said support pole, with said lifting bracket providing access to said top edge of said support pole, for placing said removable bolt through said pole bracket above said top edge of said support pole, so that said pole bracket is prevented from lowering on said support pole by said removable bolt, with said lifting bracket removable after said removable bolt secures said pole bracket to said support pole.

2. The solar array lifting assembly of claim 1 which further comprises a lifting pulley attached to the end of said lifting bracket; in which said lifting assembly comprises a lifting cable for sliding engagement with said lifting pulley and for attachment to said lifting mechanism and to said lifting bracket.

3. The solar array lifting assembly of claim 1 wherein said lifting mechanism is a winch mounted to said support pole with a lifting cable for passing through a lifting pulley for lifting said pole bracket.

4. The solar array lifting assembly of claim 3 wherein said winch is positioned at approximately ground level.

5. The solar array lifting assembly of claim 3 wherein said winch is a mechanical geared hand crank winch.

6. The solar array lifting assembly of claim 3 wherein said winch is an electric winch.

7. The solar array lifting assembly of claim 1 wherein said lifting bracket extends downward into the interior of said support pole.

8. A solar array lifting assembly, comprising: at least one support pole, for vertical mounting in the ground and capable of supporting a solar array at a selected height above the ground;
at least one pole bracket configured to at least partially surround said at least one support poles, configured to slide up and down said support pole, and configured to support a frame to which solar panels are attached;
a pole bracket securing mechanism for securing said pole bracket at the top of said support pole, with said pole bracket securing mechanism comprising a removable bolt which is passable from side to side of said pole bracket above a top edge of said support pole, and a retractable support placed within said support pole, said retractable support configured to retract into said support pole when said pole bracket is raised and deploy out of said support pole to support said pole bracket;
said frame for attachment to said pole bracket and for structural support and attachment of said solar panels, said frame and said solar panels forming said solar array, with said frame configured for assembly around said support pole at ground level, and for placement of said solar panels directly above said support pole;
a lifting bracket removably placeable at the top end of said support pole, said lifting bracket extending vertically into said support pole and horizontally to a position outside of the diameter of said support pole, said lifting bracket having a bracket support for supporting said lifting bracket, with said lifting bracket providing access to a top edge of said support pole, for placing said removable bolt through said pole bracket above said top edge of said support pole, so that said pole bracket is prevented from lowering on said support pole by said removable bolt with said lifting bracket removable after said removable bolt secures said pole bracket to said support pole;
a lifting pulley attached to the portion of said lifting bracket which extends past the diameter of said support pole;
a lifting cable for sliding engagement with said lifting pulley and for attachment to a lifting mechanism at one end and to said lifting bracket at another end of said cable; and
a lifting device for pulling said lifting cable through said lifting pulley and for lifting said pole bracket.

9. The solar array lifting assembly of claim 8 wherein said lifting mechanism is a winch mounted to said support pole with said lifting cable for passing through said lifting pulley for lifting said pole bracket.

* * * * *